United States Patent
Ducharme et al.

(10) Patent No.: US 9,203,617 B2
(45) Date of Patent: Dec. 1, 2015

(54) SECURE PROVISIONING OF INTEGRATED CIRCUITS AT VARIOUS STATES OF DEPLOYMENT, METHODS THEREOF

(75) Inventors: Paul D. Ducharme, Richmond Hill (CA); Solmaz Ghaznavi, Toronto (CA)

(73) Assignee: VIXS SYSTEMS, INC., Toronto (CA)

( * ) Notice: Subject to any disclaimer, the term of this patent is extended or adjusted under 35 U.S.C. 154(b) by 44 days.

(21) Appl. No.: 13/305,865

(22) Filed: Nov. 29, 2011

(65) Prior Publication Data

US 2013/0046981 A1    Feb. 21, 2013

Related U.S. Application Data

(60) Provisional application No. 61/524,633, filed on Aug. 17, 2011.

(51) Int. Cl.
| G06F 9/00 | (2006.01) |
| G06F 15/177 | (2006.01) |
| H04L 29/06 | (2006.01) |
| H04L 9/08 | (2006.01) |
| H04L 9/32 | (2006.01) |

(52) U.S. Cl.
CPC ............ *H04L 9/0866* (2013.01); *H04L 9/083* (2013.01); *H04L 9/0891* (2013.01); *H04L 9/3271* (2013.01)

(58) Field of Classification Search
CPC ............ H04L 63/0823; H04L 63/0428; H04L 63/062; H04L 9/3271; H04L 9/0869; H04L 9/0877; H04L 9/0891; H04L 9/3228; H04L 2209/12; G06F 21/123; G06F 21/76; G06F 9/44505

USPC ........ 713/168–174, 1, 2, 164, 166, 193, 194; 726/1–7, 10; 326/8

See application file for complete search history.

(56) References Cited

U.S. PATENT DOCUMENTS

| 6,067,621 | A  * | 5/2000  | Yu et al. ................... 713/172 |
| 7,188,161 | B1 * | 3/2007  | O'Neil et al. ............. 709/220 |
| 7,761,714 | B2 * | 7/2010  | Luzzi et al. ............... 713/182 |
| 7,788,480 | B2 * | 8/2010  | Winget et al. ............. 713/150 |
| 7,795,899 | B1 * | 9/2010  | Grohoski et al. ........... 326/8 |
| 7,814,181 | B1 * | 10/2010 | O'Neil et al. ............. 709/220 |
| 8,204,480 | B1 * | 6/2012  | Lindteigen et al. ........ 455/411 |
| 8,230,495 | B2 * | 7/2012  | Berry et al. ............... 726/16 |
| 2005/0097362 | A1* | 5/2005  | Winget et al. ............. 713/201 |
| 2005/0137898 | A1* | 6/2005  | Wood et al. ............... 705/1 |
| 2005/0289652 | A1* | 12/2005 | Sharma et al. ............. 726/26 |
| 2007/0016676 | A1* | 1/2007  | Breuer et al. ............. 709/225 |
| 2007/0074275 | A1* | 3/2007  | Bajko et al. .............. 726/4 |
| 2007/0083491 | A1* | 4/2007  | Walmsley et al. .......... 707/3 |
| 2007/0103193 | A1* | 5/2007  | Reblewski et al. ......... 326/41 |
| 2007/0146005 | A1* | 6/2007  | Sauber et al. ............. 326/37 |
| 2007/0150420 | A1* | 6/2007  | Iwamoto et al. ........... 705/71 |
| 2007/0174621 | A1* | 7/2007  | Ducharme ................. 713/176 |
| 2007/0186108 | A1* | 8/2007  | Passarella et al. ........ 713/171 |
| 2007/0241768 | A1* | 10/2007 | Erickson et al. ........... 326/8 |

(Continued)

*Primary Examiner* — Tae Kim

(57) ABSTRACT

An integrated circuit is provisioned after the integrated circuit has been sold and integrated into a customer's product. During provisioning, the integrated circuit is booted in a secure manner using a security value, such as a cryptographic key, owned by a manufacturer of the integrated circuit, or by a purchaser of the integrated circuit, to establish a secure communications channel with a provisioning server. Once the secure communications channel is established, the integrated circuit can be provisioned with a security value that is owned by the purchaser of the integrated circuit and the manufacturer's security value is disabled.

25 Claims, 3 Drawing Sheets

(56) References Cited

U.S. PATENT DOCUMENTS

| | | | |
|---|---|---|---|
| 2007/0257813 A1* | 11/2007 | Vaswani et al. | 340/870.02 |
| 2007/0297396 A1* | 12/2007 | Eldar et al. | 370/356 |
| 2008/0143373 A1* | 6/2008 | Bonaccio et al. | 326/8 |
| 2008/0189554 A1* | 8/2008 | Ali et al. | 713/189 |
| 2009/0031141 A1* | 1/2009 | Pearson et al. | 713/187 |
| 2009/0069050 A1* | 3/2009 | Jain et al. | 455/558 |
| 2009/0086980 A1* | 4/2009 | Glendinning | 380/282 |
| 2009/0100266 A1* | 4/2009 | Abe | 713/175 |
| 2009/0102505 A1* | 4/2009 | Anderson et al. | 326/8 |
| 2009/0196415 A1* | 8/2009 | Agagliate et al. | 380/28 |
| 2010/0287363 A1* | 11/2010 | Thorsen | 713/2 |
| 2011/0161672 A1* | 6/2011 | Martinez et al. | 713/176 |
| 2012/0137137 A1* | 5/2012 | Brickell et al. | 713/182 |
| 2012/0159602 A1* | 6/2012 | Haynes | 726/9 |
| 2012/0252531 A1* | 10/2012 | King et al. | 455/558 |
| 2012/0331287 A1* | 12/2012 | Bowman et al. | 713/156 |

\* cited by examiner

US 9,203,617 B2

SECURE PROVISIONING OF INTEGRATED CIRCUITS AT VARIOUS STATES OF DEPLOYMENT, METHODS THEREOF

CROSS-REFERENCE TO RELATED APPLICATION(S)

The present application is a non-provisional application of U.S. Provisional Patent Application No. 61/524,633, entitled "Secure Provisioning of Chips at Various States of Deployment, Methods Thereof" filed on Aug. 17, 2011, the entirety of which is herein incorporated by reference.

FIELD OF THE DISCLOSURE

The present disclosure relates generally to data processing and more particularly to provisioning data processors with cryptographic keys.

BACKGROUND

Concerns about content ownership and copyright protection are driving the development of security procedures for preventing unauthorized copying, modification or distribution of multimedia content. One conventional security procedure includes storing cryptographic keys at electronic devices, such as integrated circuits (ICs) and systems that include ICs. By storing the customer's keys at the IC during manufacturing, the manufacturer of an IC can provide their customers the ability to design systems that securely communicate with other systems containing the corresponding cryptographic key. Provisioning of an IC with cryptographic keys can be accomplished by an IC manufacturer at either a wafer stage of production or at a packaged stage of production. Regardless, the cost of inventorying provisioned ICs, the liability costs associated with provisioning ICs, and the time required to provision individual ICs with customer owned cryptographic keys is costly to IC manufacturers and their customers.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
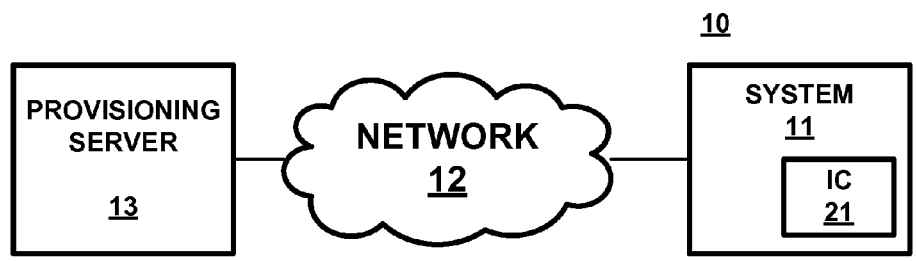
FIG. 1 is a block diagram illustrating an exemplary communications network with a system being provisioned in accordance with the present disclosure.

The following description is intended to convey a thorough understanding of the present disclosure by providing a number of specific embodiments and details involving the provisioning of ICs and systems containing the ICs. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

The term "integrated circuit" as used herein is intended to refer to an electronic device formed at a common substrate, such as a semiconductor substrate. The terms "device" and "system" as used herein are interchangeable terms. For example, a multimedia system, such as a set-top box, that includes an integrated circuit and other components can be referred to as a "system" or a "device". An integrated circuit that includes one or more data processors, such as a general purpose instruction based data processor and a dedicated graphics processor, can also be referred to as a "system" or a "device".

The term "one time programmable storage location (OTP)", as used herein, is intended to refer to a storage component (e.g., a register, memory, cache, buffer, etc.), or portion thereof, whereby a value at each bit location can transition only once while the storage component is implemented in a system. To illustrate, OTP memories often are manufactured to be in a cleared state so as to originally store a value representative of a '0' at each bit location. These OTP memories then can be programmed to store data by transitioning the appropriate bit locations to a value representative of a '1' so that the resulting binary sequence represents the desired stored data. However, once a bit location is transitioned to a value of '1', it cannot be transitioned back to a value of '0' by the systems in which they are implemented. Often, OTPs can't be reprogrammed back to the original bit values in any non-invasive circumstance. Other examples of OTP storage locations include non-volatile memories and programmable read-only memories that although reprogrammable, require that they be removed from the system and returned to a manufacturer or third-party for reprogramming.

Due to their particular utility for digital multimedia content protection, the exemplary provisioning techniques disclosed herein are described in the context of multimedia systems. Examples of multimedia systems can include complete multimedia systems manufactured by original equipment manufacturers, such as digital video disc (DVD) players, cable set-top boxes (STB), portable video systems, televisions, desktop computers, laptop computers, video-enabled personal digital assistants (PDAs), video-enabled phones, etc., or processing sub-components for use in complete multimedia systems, such as video processors, video or audio decoders/encoders/transcoders, display controllers, and the like, implemented as, for example, a an integrated circuit. Those of ordinary skill in the art may implement these techniques in other contexts using the guidelines provided herein without departing from the scope of the present disclosure.

FIGS. 1-4 illustrate exemplary techniques that facilitate provisioning an integrated circuit after the integrated circuit has been sold and integrated into a customer's end-system. During provisioning, the integrated circuit is booted in a secure manner that allows limited access to features of the end system including the ability to establish a secure communications channel with a provisioning server. Once the secure communications channel is established, the integrated circuit can be provisioned with a security value, provided by the provisioning server, that is owned by the integrated circuit's owner. After provisioning with the value provided by the provisioning server, a security value of the manufacturer that was used to establish the secure communications with the provisioning server is disabled. By way of example, provisioning is the process of storing a security value at a device, such as at a STB, or more specifically at an integrated circuit of the STB. The security value can be a stand alone value(s) or a portion of a certificate that includes other information. Once provisioned, the security value provided by the owner is used to authenticate a communication as part of establishing a secure communication channel between the system that includes the integrated circuit and a remote location. Various operations/features of the integrated circuit, such as use of encryption and decryption resources and access to specific memory locations, can be controlled only after provisioning of the integrated circuit by the purchaser of the integrated circuit.

Referring to FIG. 1, an exemplary communications network 10 is illustrated in accordance with a specific embodiment of the present invention. As depicted, the network 10 includes a provisioning server 13 that communicates with a remote system 11 over a network 12 to facilitate provisioning of the system 11. The system 11 includes an integrated circuit 21 (IC 21) that can be mounted on a printed circuit board of the system 11. IC 21 can include a data processor that controls the system 11 in various modes of operation including during the provisioning process. The IC 21 can include one or more digital data processors, such as general purpose or dedicated instruction-based data processors, state machines, and the like to manipulate signals in a manner consistent with the disclosure herein. For purposes of discussion, it is assumed that the system 11 is a multimedia system, and is, therefore, also referred to herein as multimedia system 11. The multimedia system 11 can reside at the location of an original equipment manufacturer (OEM) that acquired, e.g., purchased, the IC 21 in a pre-provisioned state, or at the location of a customer of the OEM. The term "pre-provisioned" and its variants as used herein is intended to mean a device prior to provisioning. Therefore, at the time the OEM acquires a pre-provisioned IC 21, the IC 21 is not provisioned with the OEM's security values as required to enable full-featured operation of the OEM's system by an end user, such as the ability to store certificates or to use encryption/decryption features of the IC 21

In a particular embodiment, the IC 21 is placed in a pre-provisioned state with provisioning security information, e.g. a security value, owned by the manufacturer of the integrated circuit 21. The provisioning security information is used to facilitate provisioning of the IC 21 by the owner of the provisioning security information, and does not include any security values capable of facilitating full-feature operation. As such, the customer's system 11 that includes the integrated circuit 21 is pre-provisioned (un-provisioned) by virtue of the integrated circuit 21 not having any security values owned by the manufacturer's customer that are necessary to facilitate full-feature operations, such as the encryption/decryption of content information by use of IC 21 encryption/decryption resources. In an alternate embodiment, the IC 21 is pre-provisioned with a plurality of provisioning security information, each one of the provisioning security information capable of being used to facilitate provisioning of the IC 21. For example, IC 21 can include the provisioning security information owned by the manufacturer of the IC 21 as well as provisioning security information owned by each one of a plurality of different customers. For purposes of discussion, it is presumed that the IC 21 only includes provisioning security information provided by the manufacturer.

During boot-up of system 11, provisioning security information owned by the manufacturer is used during a provisioning mode to establish a secure communications channel between the system 11 and the provisioning server 13. Customer owned provisioning information, e.g., security values associated with a customer certificate, is then provided from the provisioning server 13 to the integrated circuit 21/system 11 after the secure communications channel is established. The customer owned provisioning information received at the IC 21 is stored at a non-volatile location of the integrated circuit 21, whereby the system 11/IC 21 is customer provisioned. In a particular embodiment after provisioning, the provisioning security values owned by the manufacturer are disabled after customer provisioning. Specific embodiments of FIG. 1 will be better understood with respect to FIGS. 2 through 4.

Figure 2:
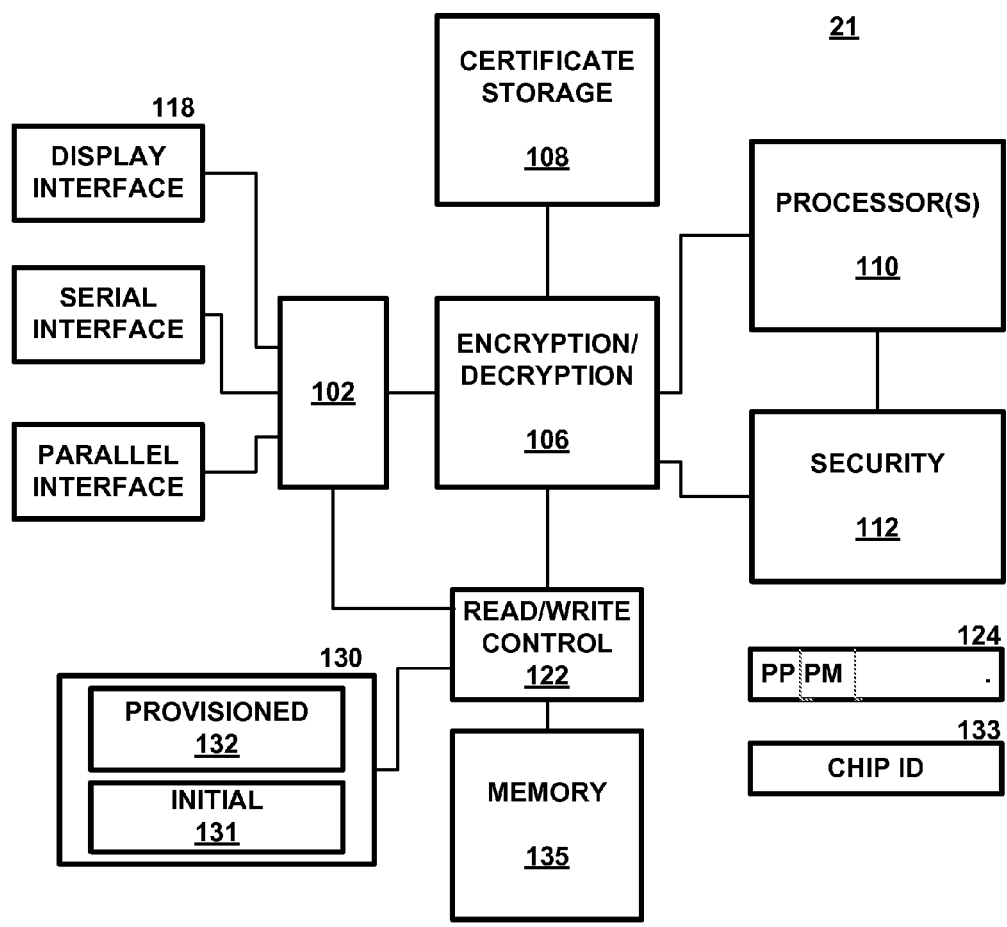
FIG. 2 is block diagram of an integrated circuit in accordance with a specific embodiment of the present disclosure.

FIG. 2 illustrates a particular embodiment of a portion of integrated circuit 21 of multimedia system 11. As depicted, the IC 21 includes an input/output interface 102, an encryption/decryption module 106, a certificate storage location 108, a data processing module 110, a security module 112, a mass storage interface 116, a display interface 118, a read/write control module 122, a provisioning storage component 130, memory 135, a system identifier 133, and a plurality of read-only storage and OTP storage locations, such as OTP storage location 124.

The various components of the IC 21 may be implemented as hardware, software, firmware, or combinations thereof. For example, in one implementation IC 21 may include a multimedia processor at data processor 110 that is implemented as circuitry, or alternately, as executable instructions such as microcode executed by a central processing unit of the multimedia processor. In another exemplary implementation, some or all of the functionality of the IC 21 may be implemented as software instructions executed by a general purpose processor at data processor 110. It will be appreciated that the processor module 110 can include more than one processor, such as both a dedicated multimedia processor and a general purpose processor.

The interface 102 receives input/output (IO) information from one or more input locations 103 that can include serial IO, parallel IO, display IO (serial or parallel), and the like. Received information can include encrypted and non-encrypted data. Encrypted data can be provided to the encryption/decryption module 106 for decryption before being forwarded to the processor module 110 for further processing or to a memory location for storage. Non-encrypted data can be provided to the encryption/decryption module 106 for encryption, to a memory location for storage, to processor module 110 for processing, and the like. In one embodiment, serial inputs of the integrated circuit 21 can include an industry standard interface, such as an $I^2C$ interface, a Serial Peripheral Interface (SPI), or a proprietary interface. Parallel inputs can include data busses having multiple data pins controlled by a common set of control pins such as is typically used to communicate with a mass storage device external to an integrated circuit, or large amounts of external system memory, which can be volatile memory or non-volatile memory. A mass storage device of the system 11 (not shown) can provide previously stored or buffered multimedia data (the content source in this instance) to the IC 21. In instances where the system 11 is a real-time multimedia system, an input to the multimedia data interface 102 can receive information from, a cable television interface (e.g., a coaxial cable interface), a data packet network interface (e.g., an Ethernet interface), a wireless interface, and the like. Information received at the interface 102 that is to be decoded can be the entire data stream or a portion of the data stream, such as a data payload of particular packets of a packetized transport stream. For example, the interface 102 can include a demultiplexor that selects only specific packets of a packetized data stream, and further provides only the data payload of the selected packets to a particular module of the IC 21 for processing. Thus, the interface 102 can include a demultiplexor to select one or more specific elementary streams from a plurality of elementary streams being transmitted over a transport stream, where the elementary stream is provided to the encryption/decryption module, if encrypted, or to the processor 110.

Encrypted information provided to the encryption decryption engine via the data interface 102 can include: instructions to be decrypted, stored, and executed at the integrated circuit 21; multimedia content from a content source to be decrypted, decoded, and transmitted for display; and the like. The encryption/decryption module 106 can decode encrypted information using security values from the certificate storage location 108, from the IC security location 130, and the like.

In one embodiment, the encryption/decryption module 106 uses a public key security value stored at certificate storage location 108 or location 130 to authenticate a communication with a source, and then establishes or receives a symmetric key with the source to encrypt/decrypt additional communications.

In one embodiment, the security values stored at IC security location 130 and the certificates stored at certificate storage 108 can be used by the encryption/decryption module 106 to encrypt data and decrypt data using an asymmetric algorithm in order to authenticate a communication with a source. For example, in one embodiment, security values, e.g., private keys, stored at IC security location 130 are secrets of their owners that are used to establish a secure communication. In particular, a private key stored at 131 is used to establish a secure communication with the provisioning server 13.

In one embodiment, prior to establishing a secure communication channel based on the first cryptographic key, it may be determined that a plurality of cryptographic keys stored at the first non-volatile memory are not capable of establishing the secure communication channel.

In one embodiment, it may be determined at an integrated circuit that a first cryptographic key stored at the integrated circuit is not authorized to establish a secure communication channel with a remote provisioning server. Responsive to determining the first cryptographic key is not authorized, it may be determined that a second cryptographic key stored at the integrated circuit is authorized to establish the secure communication channel with the remote provisioning server. It may be determined that the second cryptographic key is authorized by establishing the secure communication channel between the integrated circuit and the remote provisioning server based upon the second cryptographic key. A third cryptographic key may be received from the remote provisioning server via the secure communication channel. The third cryptographic key may be stored at a non-volatile location of the integrated circuit. Use of the first cryptographic key and use of the second cryptographic key by the integrated circuit may be disabled in response to storing the third cryptographic key.

In one embodiment, the first cryptographic key and the second cryptographic key may have different owners. In one embodiment, one of the different owners is the manufacturer of the integrated circuit. In one embodiment, neither of the different owners is the manufacturer of the integrated circuit.

Certificates stored at location 108 can be provided by various content providers to ensure only authorized users are able to access their content. Certificates at location 108 can be used by encryption/decryption module 106 to authenticate a communication with an owner of the certificate, after which a symmetric, or other key, can be determined that is used to encrypt/decrypt multimedia content. Certificates provided by customers that are stored at 108 can themselves be encrypted based upon other security values, such as the security value stored at the IC security location 132. According to a particular embodiment, the security values at IC security 130 are stored prior to receiving and storing any certificates at certificate storage 108. In another embodiment, certificates cannot be stored at IC security location 108 until after the IC 21 is customer provisioned as described herein. In another embodiment, certificates can be stored at certificate storage location 108, but are not usable by the encryption/decryption module 106 prior to the IC 21 being customer provisioned.

The IC security location 130 includes storage locations 131 and 132. Storage location 131 includes initial security values that are stored prior to the IC 21 being customer provisioned. For example, a manufacturer of a device can provide the security values stored at 131 by forming hardwired values that are formed during processing of the integrated circuit device. For example, the initial security values can be defined by one or more metal masks used to form metal interconnects at the IC 21. In another embodiment, the initial security values are hardwired subsequent to formation of metal layers by virtue of blowing fuses formed at the IC 21. For example, fuses can be blown, e.g., placed in a conductive or non-conductive state, by use of laser techniques, or by electrical techniques that create destructive stress conditions to change a physical state of a storage location. In another embodiment, the initial security value can be programmed to an OTP location by the manufacturer. Storage location 131 stores an initial set of security values that are used when the system 11 is in a pre-provisioned mode (e.g., provisioning mode) of operation to authenticate and establish a secure communications channel with a resource, such as provisioning server 13 of FIG. 1. In one embodiment, the security values of 131 are only useable during provisioning. Storage location 132 can be a non-volatile memory location where a customer provided security value is stored during provisioning. According to one embodiment, the storage location 132 is an OTP storage location that is initially unprogrammed in system 11.

The storage locations 131 and 132 accommodate storage of security information to implement various cryptographic techniques. Although the security values are described as stored in OTP storage locations, in other embodiments some or all of the security values can be stored in non-OTP memory locations, such as general registers, ROM, RAM, caches, and the like. In one embodiment, read and write access to the storage component 130 is provided by read/write control module 122, as authorized by security module 112.

The encryption/decryption module 106 accesses one or more of the security values at locations 130, 108, and other locations to implement one or more cryptographic techniques to encrypt/decrypt data handled by the system 11. Exemplary cryptographic techniques implemented by the encryption/decryption module 106 can include Rivest-Shamir-Adleman (RSA)-based encryption, or triple DES (3DES)-based encryption, advanced encryption standard (AES)-based encryption, digital video broadcasting (DVB-CSA) encryption, Cryptomeria Cipher (C2)-based encryption, and the like. It will be appreciated that many of the cryptographic techniques implementable by the encryption/decryption module 106 make use of various security values, such as a public key, a private key, a code word (CW), an initialization value (IV), a unique system identifier (ID), and the like. Accordingly, one or more security values can be stored at the system 11 for access by the encryption/decryption module 106. In one embodiment, a CW, an IV, and a system ID are to be stored at OTP storage locations 131 and 132 of a storage component 130. The term cryptographic key as used herein generally refers to a value used to encrypt or decrypt information in a secure manner.

The processing module 110, in one embodiment, can represent one or more data processors. For example, a dedicated multimedia processor (not shown) can be implemented to process multimedia information and a general purpose processor (not shown) can be used to implement other features of the system 11. A multimedia processor of the processing module 110 may implement a variety of processing features related to multimedia content, such as audio and/or video encoding, decoding, transcoding, scaling, filtering and the like. For example, multimedia content can processed by a multimedia processor of the processor 110 in accordance with one or more encoding/decoding schemes, such as the motion pictures experts group (MPEG) standard, the MPEG-2 standard, the MPEG-4 standard, the advanced audio encoding (AAC) standard, the Apple QuickTime standard, and the like. In at least one embodiment, the multimedia processor can operate in both a single stream processing mode, whereby only a single multimedia data stream can be processed at any given time, or a dual stream processing mode whereby two (or more) display streams can be processed concurrently. The multimedia processor can provide encoded multimedia data for storage in one or more mass storage systems (e.g., hard drives, optical disk drives, etc.) via a mass storage interface or provide decoded multimedia data at an output for display by a display system or for play by an audio system via the audio/video system interface.

In another embodiment, the processing module 110 also includes a general purpose instruction-based data processor that executes instructions fetched from a memory location external the processor module 110. For example, the instructions can be fetched from a mass storage device external IC 21, or from a memory location that is part of the IC 21, such as a read only location (not illustrated).

In one embodiment, the security module 112 enables or disables certain processing features of the device 21 based upon such factors as successful authentication of a secure communication channel, and the state of one or more locations internal to or external to device 21. For example, as described in further detail herein, security module 112 can control operation of IC 21 based on the state of bits PP and PM at storage location 124, which can indicate that the IC 21 is in one of a debug state, a provisioning state, or a provisioned state.

In one embodiment, the device 21 is originally manufactured so that the states of OTP bits PP and PM of storage location 124 are both cleared, e.g., a de-asserted or un-programmed state, that indicates the IC 21 is in a debug state that allows a debug mode of operation during which testing of the device 21 is performed to verify its operational integrity of IC 21. In the case where storage location 131 is an OTP, the initial security values owned by the manufacturer can be programmed at secure location 131 while the device 21 is in a debug state. For example, once the manufacturing integrity of the device 21 has been verified, the initial values at 131 can be stored at the IC 21. This can occur either before or after the IC 21 is packaged. In one embodiment, the security value stored at location 131 can be verified during debug mode, but not in other modes of operation. In other words, after integrity checking of IC 21 is complete the security value at location 131 will be programmed and verified.

The bit PP is programmed, and bit PM remains cleared, to indicate that the IC 21 is in a provisioning state. In the embodiment where the secure location 131 is an OTP, the security values can only be written during debug mode, therefore, the security module 112 can prevent write access to the OTP location 131 by any resource in response to the IC 21 being in provisioning mode, and can prevent reading of location 131 by any resource other than encryption/decryption module 106.

In another embodiment, the security module 112 prevents the certificate storage location 108 from being accessed during provisioning mode. Alternatively, certificate storage location 108 can be read from, but not written to during provisioning mode. In yet another embodiment, there can be another indicator associated with the IC 21, such as another OTP bit location or an external pin that can be driven to a "1" or "0" state, that in one state allows the IC 21 to operate in a non-secure mode, whereby the encryption/decryption module 106 is disabled, and access to storage location 108 and 130 is not allowed to prevent any stored security values from being read. However, when the bit location is placed in the other state, the IC 21 enters provisioning mode, and the security module 112 allows access to the encryption/decryption module 106 for the purpose of loading and decoding instruction code at memory 135, followed by execution of that code. In this mode, security values at location 132—after to an external source, such as provisioning server 13, has been authenticated by use of the initial security values stored at location 131.

After the execution of this code facilitates the receipt and storage of storing security values at location 132, the bit PM is set to place the IC 21 in a provisioned state. While in a provisioned state, the IC 21 can operate in a secure manner by using the customer's security values stored at location 132. During secure operation, the certificate storage location can be accessed to facilitate authenticating communications and decoding of various data streams as allowed by the customers system 11.

Figure 3:
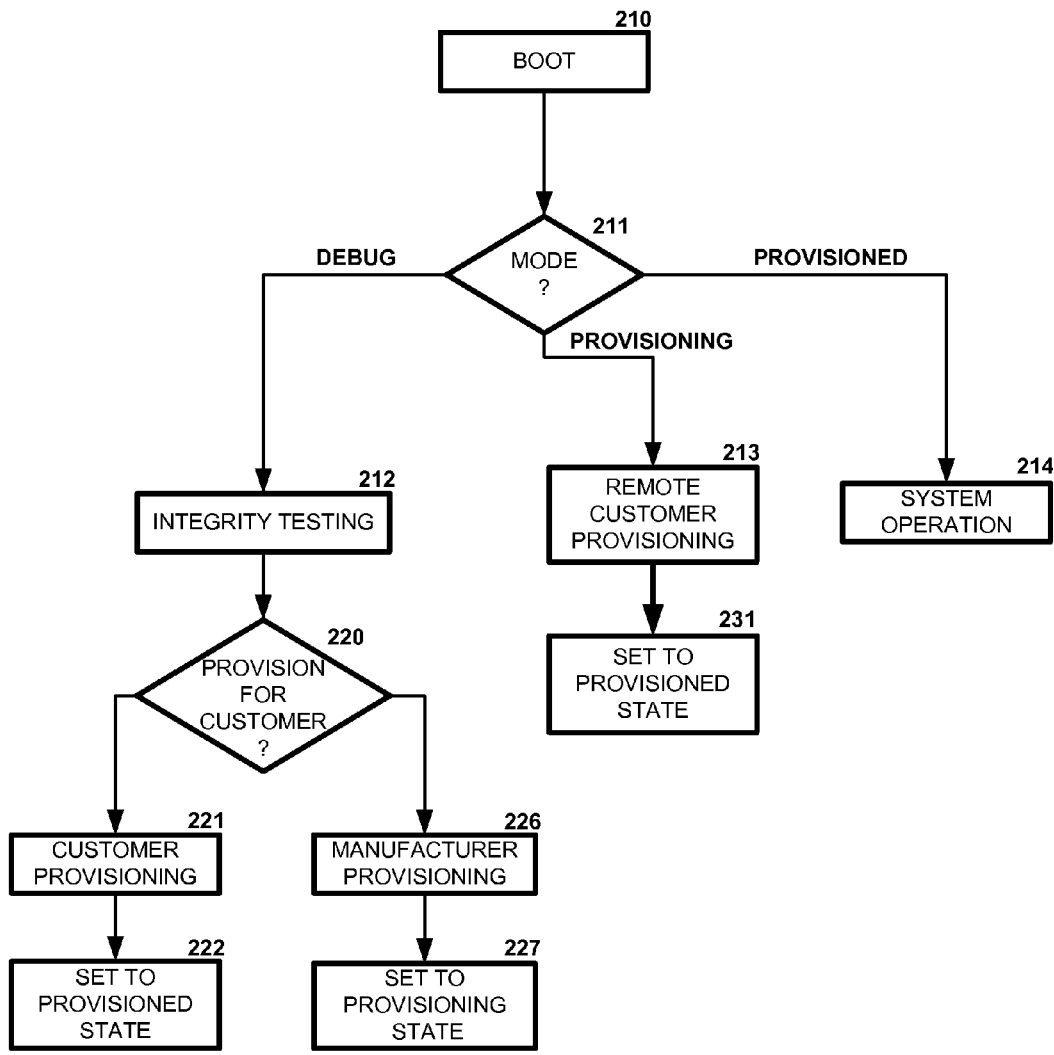
FIG. 3 is a flow diagram illustrating an exemplary method for provisioning an integrated circuit in accordance with a specific embodiment of the present disclosure.

Referring to FIG. 3, an exemplary method 200 of operation of the IC 21 is illustrated in accordance with at least one embodiment of the present disclosure. For ease of discussion, the method 200 is described in the context of the device of FIG. 2. The method 200 includes booting up the device 21 as indicated at block 210. The process of booting-up the device 21 can be the result of providing power, the result of a hard reset, such as a reset signal provided to an external pin the device, or the result of a soft reset, such as a reset initiated by a software command, and the like.

At block 211, the operational mode of the device is determined to be one of a plurality of modes based upon a state of the IC 21, including a debug mode, a provisioning or pre-provisioned mode, and a provisioned mode. For example: in response to the bits PP/PM being unprogrammed (e.g., PP/PM values of 0/0) the IC 21 is in a debug state and will operate in a debug mode of operation; in response to the bits PP being programmed (e.g., PP/PM values 1/0) the IC 21 is in a provisioning state and will operate in a provisioning mode of operation starting at block 213; in response to the bits PP/PM both being programmed (PP/PM values of 1/1) the IC 21 is in a pre-provisional state and will operate in a normal mode of operation starting at block 214.

During debug mode, the device manufacturer can test the integrity of the device as indicated at block 212. Such integrity testing typically is accomplished using automated test equipment. The use of such automated test equipment is relatively costly on a per device basis, thereby making it desirable to reduce the amount of time used to test each device. After integrity testing, it can be determined at block 220 that the IC is to be provisioned for the customer at the automated test equipment and the flow can continue with the device manufacturer provisioning the device at block 221 by storing customer owned security values at storage location 132 of the IC 21 by using the automated test equipment. In one embodiment, prior to storing security values at storage location 132, an authenticated communication between the tester and IC 21, based on initial security values at location 131, needs to be established. By requiring this authentication, only the manufacturer of IC 21 can program the location 132 when only manufacturer owned security values are available at 131. Note that the value 131 can be a hardwired location that does not require programming or a programmable location. At block 222, the automated test equipment places the device in a provisioned mode, ready for customer use. For example, the automated test equipment can program the bits PP and PM after customer security values are stored into the storage location 132 to indicate that the device is a provisioned part that will operate in provisioned mode.

Alternatively, it can be determined at block 220 that the IC is not to be provisioned for the customer at the automated test equipment as part of the manufacturing process, and instead the flow proceeds to block 226 where the automated test equipment places the device in a pre-provisioned state. This results in the IC 21 operating in a provisioning mode of operation after booting, thereby allowing for remote provisioning of the device to occur at a later time as described herein. For example, the automated test equipment can program the manufacturer's security values at the location 131 of the device and program bit PP while leaving bit PM cleared to indicate that the device is in a provisioning state, e.g., that the part has not been provisioned for end use by a customer.

Referring back to block 212, if it is determined during boot-up that the IC 21 is in a provisioning state, and therefore still needs to be provisioned, the device will continue booting in a provisioning mode of operation at block 213. During provisioning mode the IC 21 uses the initial security values stored at location 131 that are provided by the manufacturer to facilitate secure provisioning of the IC 21 with customer owned security values, as discussed in greater detail below. After storing security values at storage location 132, flow proceeds to block 231 where the PM bit of the device 100 is programmed to place the device in a provisioned state, wherein the IC 21 will boot in a provisioned mode of operation. Note that security module 112 prevents an IC 21 having a provisioned state from booting in debug mode or pre-provisional mode. In another embodiment, security module 112 only allows the execution of instructions from memory 135, or a portion of memory 135, in response to IC 21 being in a provisioning state.

If after boot-up at block 211 of FIG. 3 it is determined that the IC 21 is a provisioned device, the system 11 will complete booting in a manner specified by the customer's system implementation as indicated at block 214. For example, the device can boot in a secure manner using the customer owned security values stored at location 132. For example, the security values stored at location 132 can be used to authenticate a secure communication prior to allowing the IC 21 to decrypt software that is executed by the processing module 110. In addition, the customer owned security values can be used to establish secure communication channels through which security certificates are communicated for storage at certificate storage location 108 to enable various features. In a particular embodiment, security module 112 only allows certificates to be stored at certificate storage location 108 when the IC 21 is in a provisioned state with valid security values at location 132. In another embodiment, the certificates can be stored at location 108, but not accessible prior to IC being provisioned.

Figure 4:
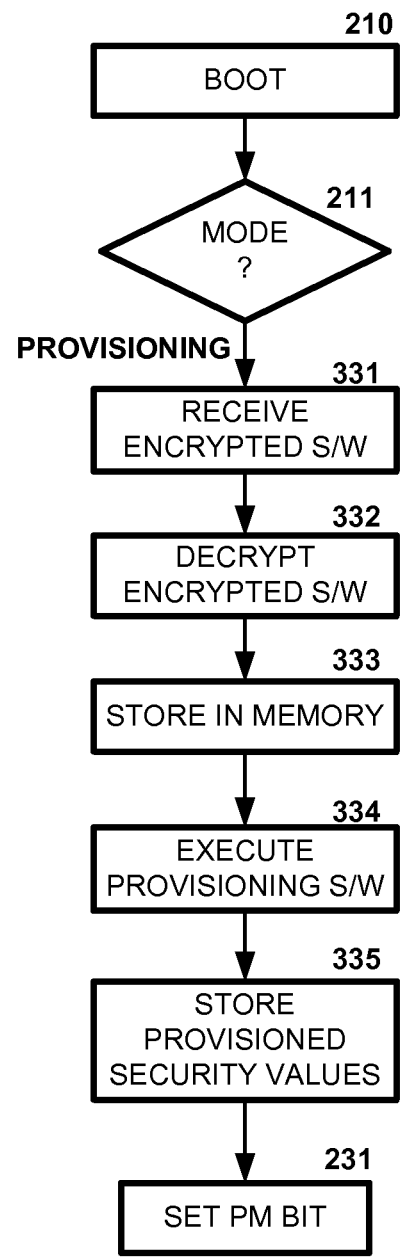
FIG. 4 is a flow diagram illustrating a portion of the flow diagram of FIG. 3 in greater detail in accordance with a specific embodiment of the present disclosure.

FIG. 4 illustrates a specific embodiment of a provisioning mode of operation. In particular, blocks 331-335 correspond to a particular embodiment of block 231 of FIG. 3. At block 331, encrypted provisioning software is received. The encrypted software includes instructions to be executed by the processor module 110 to facilitate provisioning of the IC 21 with customer owned security information. The encrypted software can be received from a storage location of the IC 21, from a storage location of the system 11 that is external to IC 21, or from a secure communication channel. In a particular embodiment, responsive to the IC 21 being in provisioning mode, the IC 21 can receive encrypted information from a particular location, or from a particular input of the device as a security feature. For example, as a security feature, during provisioning mode of operation, the interface 102 can be required by security module 112 to receive encrypted software that is provided to the encryption/decryption module 106, which decrypts and stores the instructions at memory 135. At block 332, as indicated above, the received information is decrypted by encryption/decryption module 106 based upon the initial security values stored at location 131. In a particular embodiment, during provisioning mode, the initial security values at location 131 are the only security values available to the encryption/decryption module 106. For example, no other security values can be accessed during provisioning mode from the certificate storage location 108. This can occur by virtue of there not being any certificates present or by virtue of security module 112 not allowing existing certificates to be accessible for use. Alternatively, the program information can be decrypted by other secure values, such as a symmetric key, after authenticating a communication based upon the security values stored at location 131.

At block 333 the decrypted provisioning software is stored at a predetermined location from which the processing module will begin execution. For example, the decrypted provisioning software can be stored at IC 21 in memory 135 which can be an SRAM location.

At block 334, the provisioning software stored in memory 135 is executed by the processing module 110. In a particular embodiment, processor 110 can only execute code at the predefined location of memory 135 in response to encrypted information decrypted at encryption/decryption module 106 being loaded at memory 135. During execution, the provisioning software includes a communications protocol allowing the system 11 to communicate over a network 12 with a remote provisioning server. In accordance with a specific embodiment of the present disclosure network 12 includes the internet. The provisioning software stored at memory 135 can establish a secure communications channel with the server 13 based upon the initial security values at location 131. For example, the secure communications channel can be established by performing a mutual challenge-response authentication by a symmetric technique using a symmetric cryptographic key (K) that is stored at both location 131 of IC 21 and at the provisioning server 13. Alternatively, asymmetric keys can be used.

For example, after the system connects to the network 12 under the control of IC 21, IC 21 defines a random value ($r_c$) that is encrypted with the symmetric key K ($E_K(r_c)$) and sends it to the provisioning server 13. Next the provisioning server 13 decrypts $E_K(r_c)$ to obtain $r_c$, generates its own random value $r_{ps}$, encrypts $r_{ps}$ and $r_c$ with K ($E_K(r_{ps}\|r_c)$) and sends the encrypted information to the device 11. The device 11 decrypts $E_K(r_{ps}\|r_c)$ to receive $r_{ps}$, and verify the presence of $r_c$. The device 11 then encrypts $r_{ps}$ ($E_K(r_{ps})$) using the key K and provides this encrypted value to the provisioning server. Once both the device 11 and provisioning server 13 authenticate successfully, the device 11 will securely send the unique chip identifier of IC 21 from storage location 133 to the provisioning server. In one embodiment, communications from the device 11 subsequent to authentication are encrypted using the random number $r_c$, the random number $r_{ps}$, or both. Based upon the device ID, the provisioning server can determine a customer required security code to be stored at the IC 21. For example, the provisioning server can provide security values owned by a particular customer based upon the chip identifier, a MAC identifier of the system 11, an IP address of the system 11, and the like. Note that the provisioning server can be owned by the manufacturer of the device 100, to ensure the initial security values stored at location 131 remain secret to the manufacturer. After provisioning of the IC 21, the provisioning server 13 can notify the customer, in a secure manner, that a system 11 has a device with a particular device ID, and has been provisioned. The notification can include the device ID, and the provisioned security values now stored at location 132*f*

At block 335, the provisioned security values provided by the provisioning server 13 are received at the IC 21 and are stored at location 132 of the device. At block 231, also illustrated at FIG. 3, the provisioning instructions cause the PM bit of register 124 to be set, thereby placing the IC 21 in a provisioned mode of operation.

Referring back to FIG. 3, when it is determined at block 211 that a device is a provisioned device, flow proceeds to block 214. Block 214 represents an operating mode whereby the customer has access to locations 132 and 108 for use by a customer defined application of the system 11. In one embodiment, by virtue of the PM bit being set, the initial security values stored at 131 are no longer accessible to the encryption/decryption engine 106. Instead, the encryption/decryption engine 106 can only access the security values stored at location 132 and the security values associated with the certificates stored at the certificate storage location 108. Thus, setting the PM bit disables use of the security values at location 131, and allows access to the certificates at location 108.

Other embodiments, uses, and advantages of the present disclosure will be apparent to those skilled in the art from consideration of the specification and practice of the disclosure disclosed herein. For example, the manner in which information is encrypted and sent across the secure channel can vary. For example, security values themselves can be encrypted with a random symmetric key when being sent to the system 11 by the provisioning server. In a specific embodiment, the IC 21 can be provisioned for specific geographic regions and markets differently at later stage. More specifically the same product may be sold in different geographic regions but the region specific provisioning may be delayed. The provisioning server can determine appropriate security values to be sent to system 11 by a data base stored at the provisioning server that indicates a region based upon the chip ID stored at location 133, or by regional information that can be determined by network communication parameters acquired during communications between the system 11 and the provisioning server 13, such as an IP address. As a further example, provisioning can occur between system 11 and other remote devices, such as a dedicated provisioning device at a customer's location to facilitate provisioning by the provider of the system 11 prior to being deployed to an end user.

In addition, it will be appreciated that the disclosed scheme is more secure compared to provisioning at the earlier stages, since it has the advantage of limiting key exposure to the smallest security perimeter (i.e. the IC 21). This has the advantage of using secure provisioning servers can be secure anywhere in the world which would reduce auditing expenses, allowing for a single centralized provisioning server that can be used to serve multiple customers, multiple products, and multiple generations of integrated circuits.

The specification and drawings should be considered exemplary only, and the scope of the disclosure is accordingly intended to be limited only by the following claims and equivalents thereof. In accordance with various embodiments of the present disclosure, the methods described herein may be implemented, in whole or in part, by software programs executable by a processor device. The present disclosure contemplates a computer readable storage device that includes instructions or receives and provides instructions for execution responsive to a propagated signal, so that a device connected to a network can communicate voice, video or data over the network 12. Further, instructions may be transmitted or received over the network 12.

In one embodiment, rather than being software instructions that directly implement the functionality described herein, the instructions instead can implement design instructions representative of a hardware implementation of the above-described functionality that are then synthesized to determine the electrical and electronic design for a processing device that implements the above-described invention. To illustrate, these hardware-design instructions can include register transfer level (RTL) instructions, Verilog instructions, and the like.

While a computer readable storage device can be a single storage device, the computer readable storage device can include a single storage device or multiple storage devices, such as a centralized or distributed database, and/or associated caches and servers that store one or more sets of instructions. The term "computer readable storage device" shall also include any storage device that is capable of storing a set of instructions for execution by a processor or that causes a processor device to perform any one or more of the methods or operations disclosed herein.

In a particular embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium. Accordingly, the disclosure is considered to include any one or more of a computer readable storage device or a distribution medium and other equivalents and successor media, in which data or instructions may be stored.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method of provisioning an electronic device comprising:
   decrypting a provisioning program;
   storing the provisioning program at a first volatile memory location of an integrated circuit;
   executing the provisioning program from a data processor of the integrated circuit; wherein the provisioning program includes instructions for: establishing a secure communication channel, receiving a second cryptographic key; storing the second cryptographic key; and disabling use of a first cryptographic key;

reading a first value of a first indicator and a second value of a second indicator, said first indicator and said second indicator stored in the integrated circuit, said first value and said second value indicating a provisioning state of the electronic device;

in response to the reading the first value and the second value, establishing the secure communication channel between the integrated circuit and a remote device, the secure communication channel established based upon the first cryptographic key stored at a first non-volatile location of the integrated circuit;

receiving, via the secure communication channel, the second cryptographic key;

storing the second cryptographic key at a second non-volatile location of the integrated circuit;

changing the second value of the second indicator such that the first value and the second value indicate a provisioned state of the electronic device; and disabling the execution of programs from the first volatile memory location in response to storing the second cryptographic key;

disabling use of the first cryptographic key by the integrated circuit.

2. The method of claim 1, wherein the remote device is a provisioning server that communicates with the integrated circuit via an internet connection.

3. The method of claim 2 further comprising:
transmitting a chip identifier from the integrated circuit over the secure communication channel prior to receiving the second cryptographic key.

4. The method of claim 3, wherein establishing the secure communication channel comprises:
authenticating the provisioning server at the integrated circuit.

5. The method of claim 4, wherein authenticating comprises:
transmitting a random number generated at the integrated circuit to the provisioning server prior to receiving the second cryptographic key; and
receiving information from the provisioning server verifying receipt of the random number by the provisioning server.

6. The method of claim 5, wherein receiving the second cryptographic key comprises receiving the second cryptographic key in an encrypted state that is based on the random number.

7. The method of claim 2, wherein the first cryptographic key is owned by a manufacturer of the integrated circuit, the secure communication channel is established using a challenge-response technique, and an owner of the second cryptographic key is different than the manufacturer.

8. The method of claim 1 wherein establishing, receiving, storing, and disabling, are responsive to determining the integrated circuit is in a pre-provisioned state; and
subsequent to disabling use of the first cryptographic key, the integrated circuit is in a provisioned state from which it cannot return to the provisioning state.

9. The method of claim 8, wherein determining the integrated circuit is in the provisioning state includes checking a plurality of indicators, including the state of an external pin of the integrated circuit.

10. The method of claim 1, wherein the method further comprises the integrated circuit establishing a second secure communication channel between the integrated circuit and a second remote device based upon the second cryptographic key, wherein an owner of the second cryptographic key is different than an owner of the first cryptographic key, and wherein portions of the integrated circuit are only accessible by an authenticated communication over the second secure communication channel.

11. The method of claim 1 wherein establishing the secure communication channel includes:
reading the first cryptographic key from a hardwired location of the integrated circuit.

12. The method of claim 1 wherein establishing the secure communication channel includes:
reading the first cryptographic key from a non-volatile memory location of the integrated circuit.

13. The method of claim 1 wherein establishing the secure communication channel includes:
reading the first cryptographic key from a one-time programmable memory location of the integrated circuit.

14. The method of claim 1, wherein, prior to establishing the secure communication channel based on the first cryptographic key, establishing the secure communications channel comprises determining that a plurality of cryptographic keys stored at the first non-volatile memory are not capable of establishing the secure communication channel.

15. A method of provisioning an integrated circuit comprising:
decrypting a provisioning program;
storing the provisioning program at a first volatile memory location of a remote integrated circuit;
executing the provisioning program from a data processor of the remote integrated circuit, wherein the provisioning program includes instructions for: establishing a secure communication channel, receiving a second cryptographic key; storing the second cryptographic key; and disabling use of a first cryptographic key;
receiving a request at a provisioning server to establish the secure communication channel with the remote integrated circuit;
authenticating that the request is based upon the first cryptographic key stored at the remote integrated circuit by automated test equipment of a remote integrated circuit manufacturer of the remote integrated circuit, wherein the first cryptographic key is owned by a first owner; and
provisioning the integrated circuit to establish a second secure communication channel with another server, the provisioning comprising:
determining, based upon information provided by the remote integrated circuit, the second cryptographic key owned by a second owner to be provided to the integrated circuit; and
providing the second cryptographic key to the integrated circuit via the secure communication channel, wherein the integrated circuit is to establish the second secure communication channel based upon the second cryptographic key and to disable use of the first cryptographic key and the execution of programs from the first volatile memory location by the integrated circuit in response to receiving the second cryptographic key.

16. The method of claim 15:
wherein determining the second cryptographic key is based on an identifier of the remote integrated circuit.

17. The method of claim 15 further comprising:
receiving a location indicator that indicates a location of the integrated circuit; and
wherein determining includes determining the second cryptographic key based on the location indicator.

18. A system comprising:
a data processor of an integrated circuit;
a memory storing a set of instructions, the set of instructions having been decrypted, at a first volatile memory location of the integrated circuit to be executed as a provisioning program by the data processor:
  to read a first value of a first indicator and a second value of a second indicator, said first indicator and said second indicator stored in an integrated circuit, said first value and said second value indicating a provisioning state of the electronic device;
  in response to reading the first value and the second value, to establish a secure communication channel between the integrated circuit that includes the data processor and a remote device, the secure communication channel based upon a first cryptographic key stored at the first non-volatile location of the integrated circuit;
  to receive, via the secure communication channel, a second cryptographic key;
  to store the second cryptographic key at a second non-volatile location of the integrated circuit;
  to change the second value of the second indicator such that the first value and the second value indicate a provisioned state of the electronic device; and
  to disable use of the first cryptographic key by the integrated circuit and the execution of programs from the first volatile memory location in response to the second cryptographic key being stored.

19. The system of claim 18 further comprising a third non-volatile storage location, the set of instructions to further set the third non-volatile storage location to a provisioned state to indicate the electronic device is in a provisioned mode of operation that disables use of the first cryptographic key.

20. The system of claim 19 further comprising: a fourth non-volatile storage location that is not accessible prior to setting the third non-volatile storage location to the provisioned state.

21. The system of claim 19 wherein the integrated circuit further includes an external interface and a memory, the integrated circuit, responsive to the third non-volatile storage location storing a pre-provisioning indicator, to receive encrypted program information from the memory via the external interface and to decrypt the encrypted program information at a decryption module to obtain the set of instructions.

22. A method comprising:
decrypting a provisioning program;
storing the provisioning program at a first volatile memory location of an integrated circuit;
executing the provisioning program from a data processor of the integrated circuit; wherein the provisioning program includes instructions for: establishing a secure communication channel, receiving a second cryptographic key; storing the second cryptographic key; and disabling use of a first cryptographic key;
determining at the integrated circuit that the first cryptographic key stored at the integrated circuit by automated test equipment of an integrated circuit manufacturer of the integrated circuit is not authorized to establish the secure communication channel with a remote provisioning server;
responsive to determining the first cryptographic key is not authorized, determining that the second cryptographic key stored at the integrated circuit is authorized to establish the secure communication channel with the remote provisioning server, wherein it is determined that the second cryptographic key is authorized by establishing the secure communication channel between the integrated circuit and the remote provisioning server based upon the second cryptographic key;
receiving, via the secure communication channel, a third cryptographic key from the remote provisioning server;
storing the third cryptographic key at a non-volatile location of the integrated circuit; and
disabling use of the first cryptographic key and use of the second cryptographic key by the integrated circuit in response to storing the third cryptographic key; and
disabling the execution of programs from the first volatile memory location in response to storing the third cryptographic key.

23. The method of claim 22, wherein the first cryptographic key and the second cryptographic key have different owners.

24. The method of claim 23, wherein one of the different owners is the manufacturer of the integrated circuit.

25. The method of claim 23, wherein neither of the different owners is the manufacturer of the integrated circuit.

* * * * *